US011195219B2

(12) United States Patent
Cloak

(10) Patent No.: US 11,195,219 B2
(45) Date of Patent: Dec. 7, 2021

(54) ANNUITY THROUGH VIRTUAL INVENTORY SYSTEM WITHOUT INVENTORY

(71) Applicant: Joanne Carrie Cloak, Warminster, PA (US)

(72) Inventor: Joanne Carrie Cloak, Warminster, PA (US)

(*) Notice: Subject to any disclaimer, the term of this patent is extended or adjusted under 35 U.S.C. 154(b) by 4 days.

(21) Appl. No.: 16/797,972

(22) Filed: Feb. 21, 2020

(65) Prior Publication Data

US 2020/0273008 A1 Aug. 27, 2020

Related U.S. Application Data

(60) Provisional application No. 62/808,670, filed on Feb. 21, 2019.

(51) Int. Cl.
*G06Q 30/06* (2012.01)
*G06Q 20/18* (2012.01)
*G06Q 20/32* (2012.01)
*G06Q 20/34* (2012.01)
*G06Q 10/08* (2012.01)

(52) U.S. Cl.
CPC ..... *G06Q 30/0621* (2013.01); *G06Q 10/0833* (2013.01); *G06Q 20/18* (2013.01); *G06Q 20/322* (2013.01); *G06Q 20/341* (2013.01); *G06Q 30/0623* (2013.01); *G06Q 30/0643* (2013.01)

(58) Field of Classification Search
CPC ........... G06Q 30/0621; G06Q 30/0643; G06Q 30/0623; G06Q 20/18; G06Q 20/322; G06Q 20/341; G06Q 10/0833

USPC ............................. 705/26.1, 26.5, 27.1, 27.2
See application file for complete search history.

(56) References Cited

U.S. PATENT DOCUMENTS

| | | | | |
|---|---|---|---|---|
| 6,029,833 A | * | 2/2000 | Yeh ........................ | A47F 5/0838 108/108 |
| 2003/0028436 A1 | * | 2/2003 | Razumov ............ | G06Q 30/0225 705/27.2 |
| 2011/0010271 A1 | * | 1/2011 | Black ..................... | G06Q 20/18 705/27.2 |
| 2014/0108208 A1 | * | 4/2014 | Piana ..................... | G06Q 30/06 705/27.2 |
| 2014/0214587 A1 | * | 7/2014 | Rohm ................ | G06Q 30/0643 705/26.5 |
| 2015/0227978 A1 | * | 8/2015 | Woycik .............. | G06Q 30/0268 705/14.65 |

(Continued)

FOREIGN PATENT DOCUMENTS

CN 204839001 U * 12/2015 ............. A47B 81/00

OTHER PUBLICATIONS

2014-G97281, Apr. 2014, Derwent, Like et al.*

*Primary Examiner* — Yogesh C Garg
(74) *Attorney, Agent, or Firm* — Troutman Pepper Hamilton Sanders LLP

(57) ABSTRACT

This disclosure provides an AVI system, including: a back-end server; and one or more shopping kiosks. Each shopping kiosk includes a user device; and a stand, wherein the user device is placed on the stand. The stand further includes one or more bars at an upper part of the stand, and one or more clothing samples are capable of being hung on the one or more bars. One or more orders are placed by a customer through a shopping application installed on the user device after trying on the one or more clothing samples.

20 Claims, 17 Drawing Sheets

(56) References Cited

U.S. PATENT DOCUMENTS

2016/0183393 A1* 6/2016 Groom ..................... B62B 9/26
280/33.992

* cited by examiner

ANNUITY THROUGH VIRTUAL INVENTORY SYSTEM WITHOUT INVENTORY

CROSS REFERENCE TO RELATED APPLICATIONS

This application claims priority to U.S. provisional application Ser. No. 62/808,670, filed on Feb. 21, 2019, which is incorporated herein by reference in its entirety.

TECHNICAL FIELD

The present disclosure relates generally to a system, method and computer program product, which are used to provide an Annuity through Virtual Inventory (AVI) system, so that retailers can sell commodities, such as clothing, with a little investment, a small footprint, and no inventory at a retail location.

BACKGROUND

Customers prefer to try on clothing samples before they make a buying decision of clothing. Compared to the on-line shopping, physical stores facilitate purchases of clothing by providing the customers with a chance of trying on clothing samples on-site. However, department stores, boutiques, clothing pro shops, etc., need to occupy a large space, which results in high rent for retailers. Moreover, the retailers have to keep a high inventory of clothing in stock, which further increases the investment.

By contrast, apparel online shopping brings uncertainty to the customers. Specifically, the fit, fabrication, or size of the clothing is not guaranteed to fit or otherwise be satisfactory to the purchaser. The customers are unaware whether the clothing to be purchased matches their wardrobe or other clothing for collocation. In such cases, the clothing must be returned, which is time-consuming and expensive.

Thus, there is a need for retailers to save space and carry a low inventory, but still provide clothing samples to the customers, so that the customers can see, touch and try on clothing samples, which helps them make a buying decision.

SUMMARY

Embodiments provide an AVI system, comprising a back-end server and one or more shopping kiosks, wherein each shopping kiosk includes a user device and a stand, and the user device is placed on the stand; the stand further includes one or more bars at an upper part of the stand; one or more clothing samples are capable of being hung on the one or more bars; one or more orders are placed by a customer through a shopping application installed on the user device after trying on the one or more clothing samples.

Embodiments further provide a fulfillment center. The fulfillment center receives and fulfills the order. The order is fulfilled by selecting the ordered clothing from an inventory of clothing remote to the shopping kiosks and shipping the ordered clothing to the purchaser at a location designated by the purchaser in the order.

Embodiments further provide an AVI system, wherein the user device is a tablet, e.g., an iPad, and the shopping application is an iOS application.

Embodiments further provide an AVI system, wherein the ordered clothing is delivered to an address provided by the customer.

Embodiments further provide an AVI system, wherein the customer previews different pieces of clothing through the shopping application.

Embodiments further provide an AVI system, further comprising a backup battery, wherein the backup battery is connected to the user device.

Embodiments further provide an AVI system, further comprising a credit card processor, wherein the order is paid by a credit card through the credit card processor.

Embodiments further provide an AVI system, wherein a commission is calculated based on all the pieces of clothing sold in the one or more orders.

Embodiments further provide an AVI system, wherein the back-end server is a Shopify platform.

Embodiments further provide an AVI system, wherein the customer selects a top and a bottom separately to create a custom outfit.

Embodiments further provide a method of placing an order through a shopping kiosk comprising a stand and a user device placed on the stand, wherein the stand further comprises one or more bars and a plurality of clothing samples placed on the one or more bars. The method comprises: viewing, by a customer, contents about clothing on the user device; trying on, by the customer, at least one clothing sample to get a correct size, color, style, and material of the clothing; placing, by the customer, an order through a shopping application installed on the user device; receiving, by the customer, an invoice, order and tracking information from the shopping application; and receiving, by the customer, an article of clothing fulfilling the order.

Embodiments further provide a method of placing an order through a shopping kiosk, further comprising: providing, by a seller of the clothing, a commission to a retailer hosting the shopping kiosk.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present disclosure are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Embodiments of the present invention may be a system, a method, and/or a computer program product. The computer program product may include a computer-readable storage medium (or media) having computer readable program instructions thereon for causing a processor to carry out aspects of the present invention.

In an embodiment, a system, method, and computer program product for an AVI system are disclosed. With the system, method and computer program product, an AVI system is provided, so that a retailer can sell clothing with a little investment, minimal floor space, and low inventory. Further, the AVI system can be provided in any location, such as an airport, a train station, a theater, etc., so that the customers can do shopping while they are waiting. The shopping kiosk provided by an AVI system has a base having a footprint that only takes up approximately two square feet of floor space, or has a diameter of approximately two feet. Additionally, it is unnecessary for the retailer to keep any inventory in stock. AVI system is a hybrid of online and retail shopping that provides a customizable experience for the customer in the form of a shopping kiosk. There is no, or minimal, financial risks for the retailers, because it requires no investments in inventory. Further, it provides a unique, customizable shopping experience to the end customer.

Figure 1:
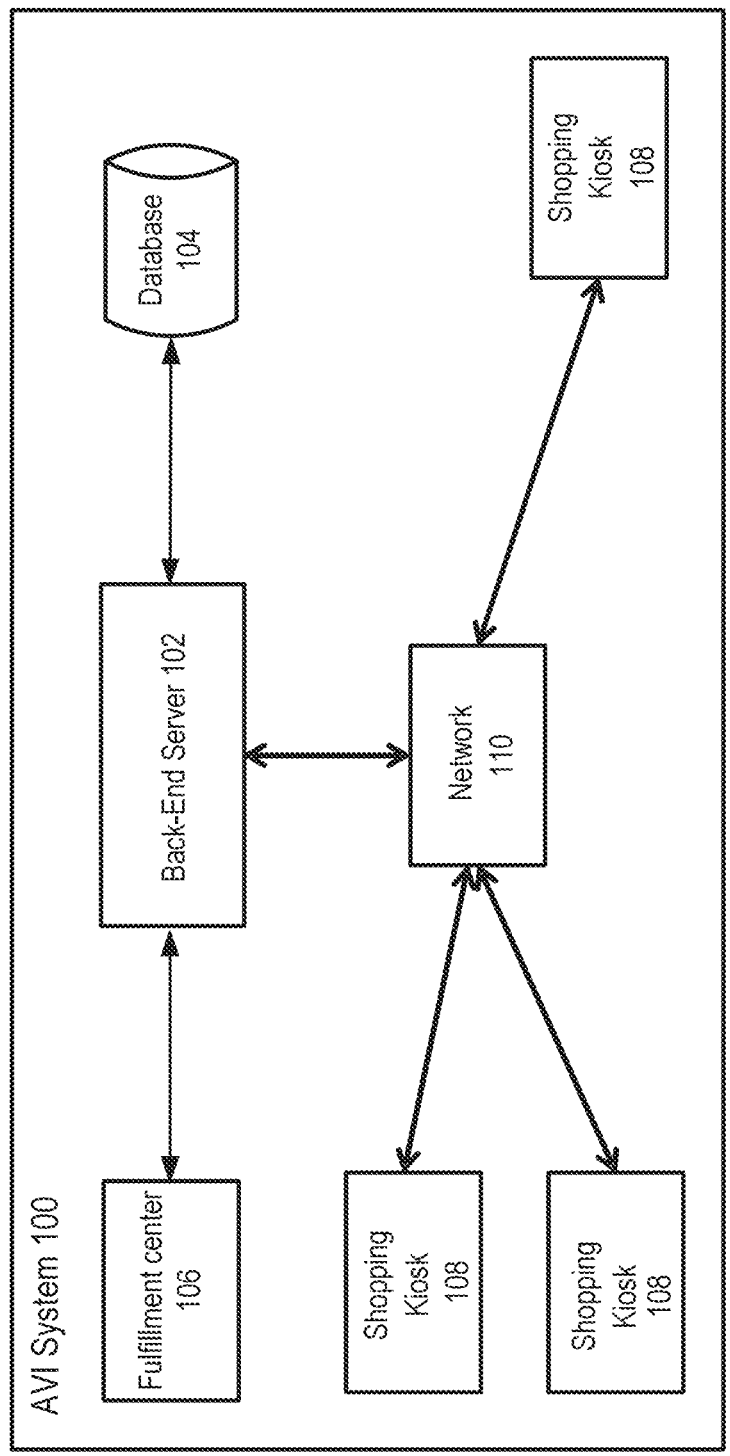
FIG. 1 depicts a diagram of one illustrative embodiment of an AVI system 100.
Figure 2:
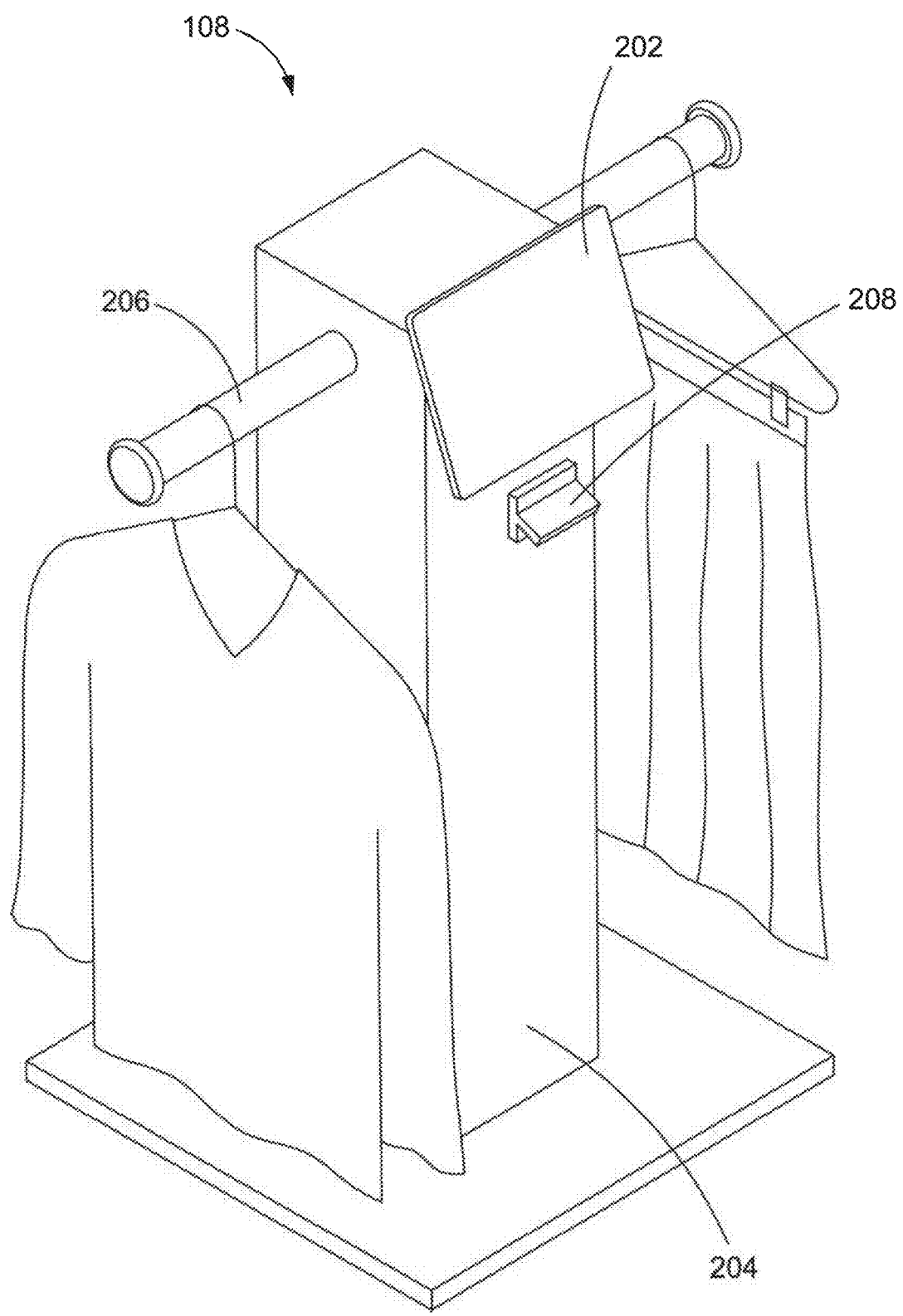
FIG. 2 depicts a diagram of one illustrative embodiment of a shopping kiosk 108 with clothing samples.

Referring to FIG. 1, in an embodiment, the AVI system 100 includes a back-end server 102, a database 104, a fulfillment center 106, and a plurality of shopping kiosks 108. The back-end server 102 communicates with the plurality of shopping kiosks 108 through a network 110, e.g., internet, Ethernet, etc. Referring to FIGS. 1 and 2, in an embodiment, the back-end server 102 communicates with a shopping application (e.g., an iOS application) installed on a user device (e.g., an iPad) 202 included in each of shopping kiosks 108. The shopping application can communicate with the back-end server 102 through an automated programming interface (API), for example, Shopify API, Magento API or a customized API based on Shopify or Magento technology. In an embodiment, the back-end server 102 can be a Shopify platform. In another embodiment, the back-end server 102 communicates with a web browser installed on the user device 202. The back-end server 102 and the shopping application can support accounting, Enterprise Resource Planning (ERP), Customer Relationship Management (CRM), and Product Information Management (PIM). In an embodiment, all the data of clothing, invoice templates, order templates, etc., are stored in a database 104 either hardwired or wirelessly connected to the back-end server 102. In another embodiment, the data can be stored in a cloud. The back-end server 102 can present the information of clothing stored in the database 104 or the cloud to the customer. The back-end server 102 can also receive information input by the customer through the shopping application, e.g., payment information, delivery information, order information including colors, sizes, and quantities, contact information, etc., store all the information in the database 104 or the cloud, and forward all the information to the fulfillment center 106. In an embodiment, the back-end server 102 communicates with a payment server of a particular bank, so that the customer can pay for an order by a credit card, a debit card, Paypal®, Apple Pay®, or a bank account. In an embodiment, the back-end server 102 can generate an invoice, an order, and tracking information, and send the invoice, the order, and tracking information to the customer. In an embodiment, the invoice, the order, and the tracking information can be emailed to the customer. In another embodiment, the invoice, the order, and the tracking information can be presented to the customer through the shopping application. In another embodiment, the invoice, the order, and the tracking information can be presented to the customer through a user account on a particular website. In an embodiment, the back-end server 102 forwards the order information to the fulfillment center 106 (e.g., a brand owner), and the fulfillment center 106 will deliver the ordered clothing to the address provided by the customer.

Figure 3:
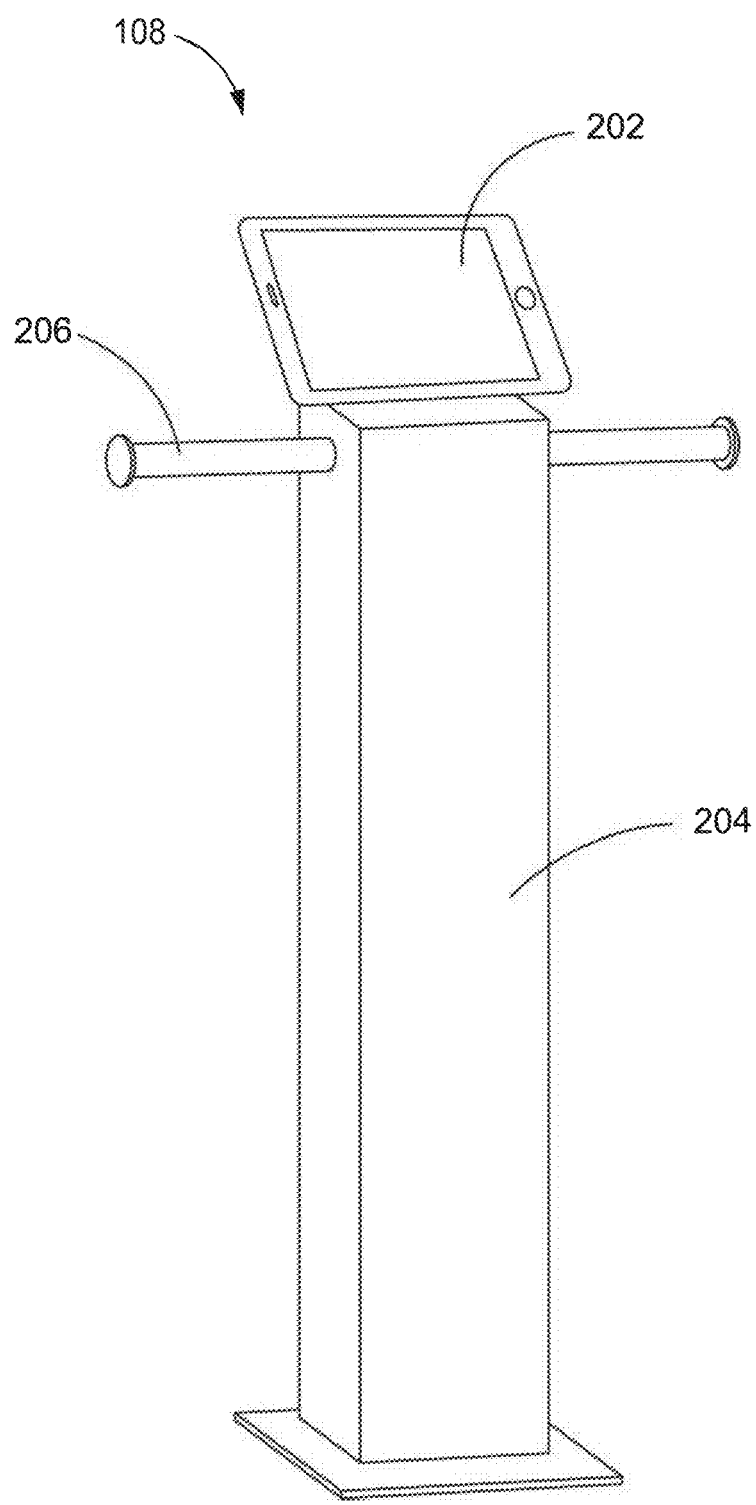
FIG. 3 depicts a diagram of another illustrative embodiment of a shopping kiosk 108.

Referring to FIGS. 2 and 3, in an embodiment, the shopping kiosk 108 includes a user device 202 and a stand 204, and the user device 202 is placed on the stand 204. The user device 202 can be a desktop computer, a laptop, an iPad, a tablet, a mobile phone, etc. Referring to FIGS. 2-7, in an embodiment, the user device 202 is a tablet, and the tablet is arranged and fixed at the top of the stand 204. The user device 202 is either hardwired or wirelessly connected to a back-end server 102 through a network. The stand 204 further includes one or more bars or racks 206 at an upper part of the stand 204. The stand can be made of metal, wood, plastic, alloy, etc. The one or more bars or racks 206 can also be made of metal, wood, plastic, alloy, etc. The one or more bars or racks 206 are configured such that a plurality of clothing samples having different sizes, materials, colors, etc., may be placed on the one or more bars or racks 206 for a display to a potential customer. In an embodiment, as shown in FIG. 2, the user device 202 is attached to the front of the stand 204. In another embodiment, as shown in FIG. 3, the user device is placed on the top of the stand 204.

Figure 4:
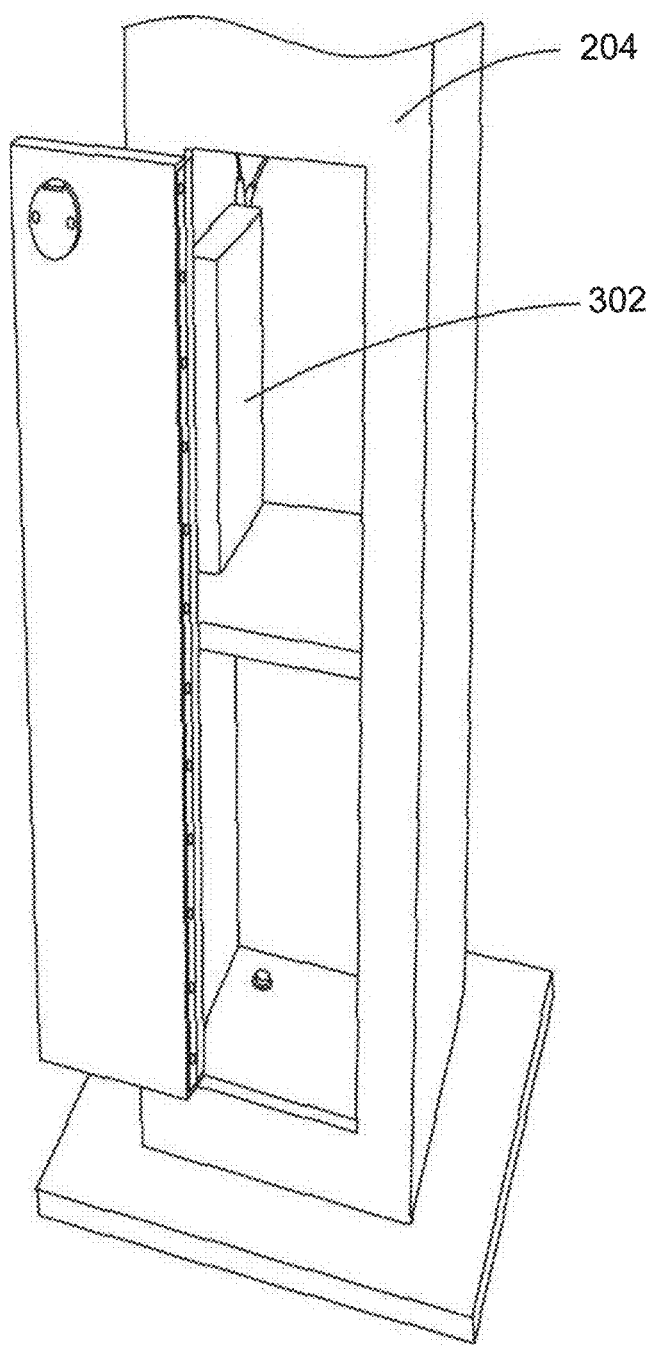
FIG. 4 depicts a diagram of one illustrative embodiment of a backup battery 302 placed inside a stand of the shopping kiosk 204.

In an embodiment, as shown in FIG. 4, the shopping kiosk 108 further includes a backup battery 302, and the backup battery 302 is placed inside the stand 204. The user device 202 (e.g., an iPad) is connected to the backup battery 302 through one or more electrical cables. The user device 202 is removable and can be removed from the stand 204. Thus, the user device 202 can be charged anywhere. In another embodiment, referring to FIG. 2, the shopping kiosk 108 further includes a credit card processor 208, which can accept credit card transactions. All payments will be received by the AVI system 100, and the funds will then be distributed to the clothing provider (e.g., brand owner) after the AVI percentage of sales are completed.

Figure 5:
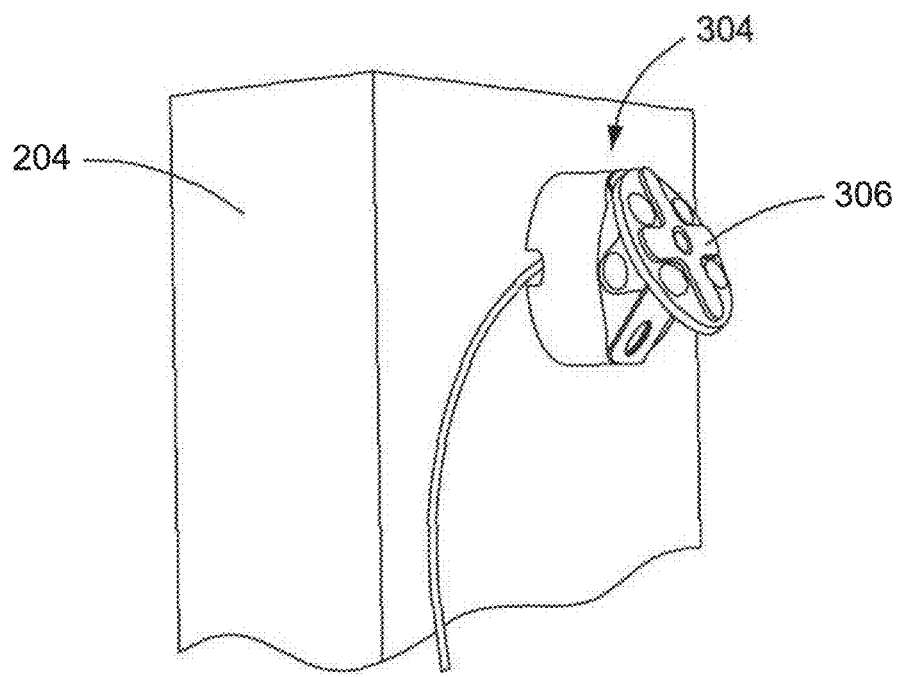
FIG. 5 depicts a diagram of one illustrative embodiment of a connector 306 for a user device 202, wherein the connector is secured to the front of the stand.
Figure 6:
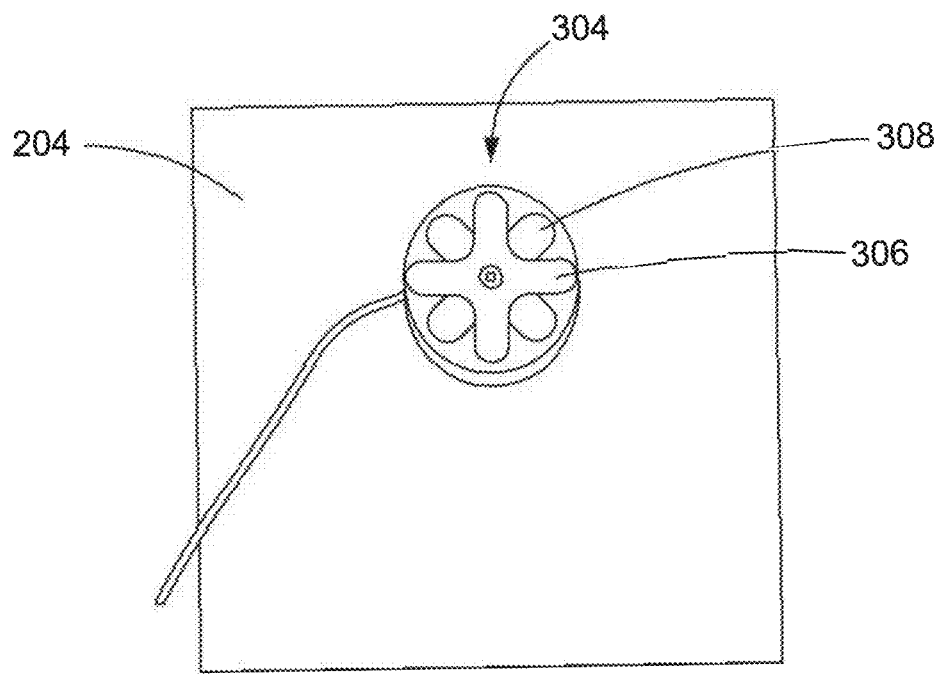
FIG. 6 depicts another diagram of the connector of FIG. 5.
Figure 7:
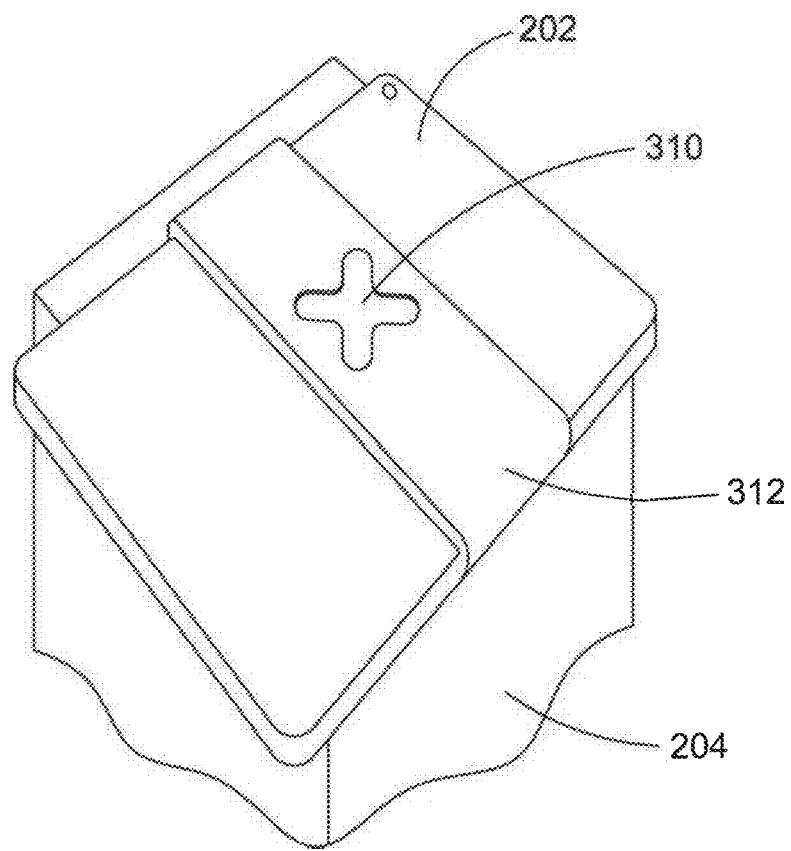
FIG. 7 depicts a diagram of one illustrative embodiment of a groove 310 in a holder 312 of the user device 202.
Figure 8:
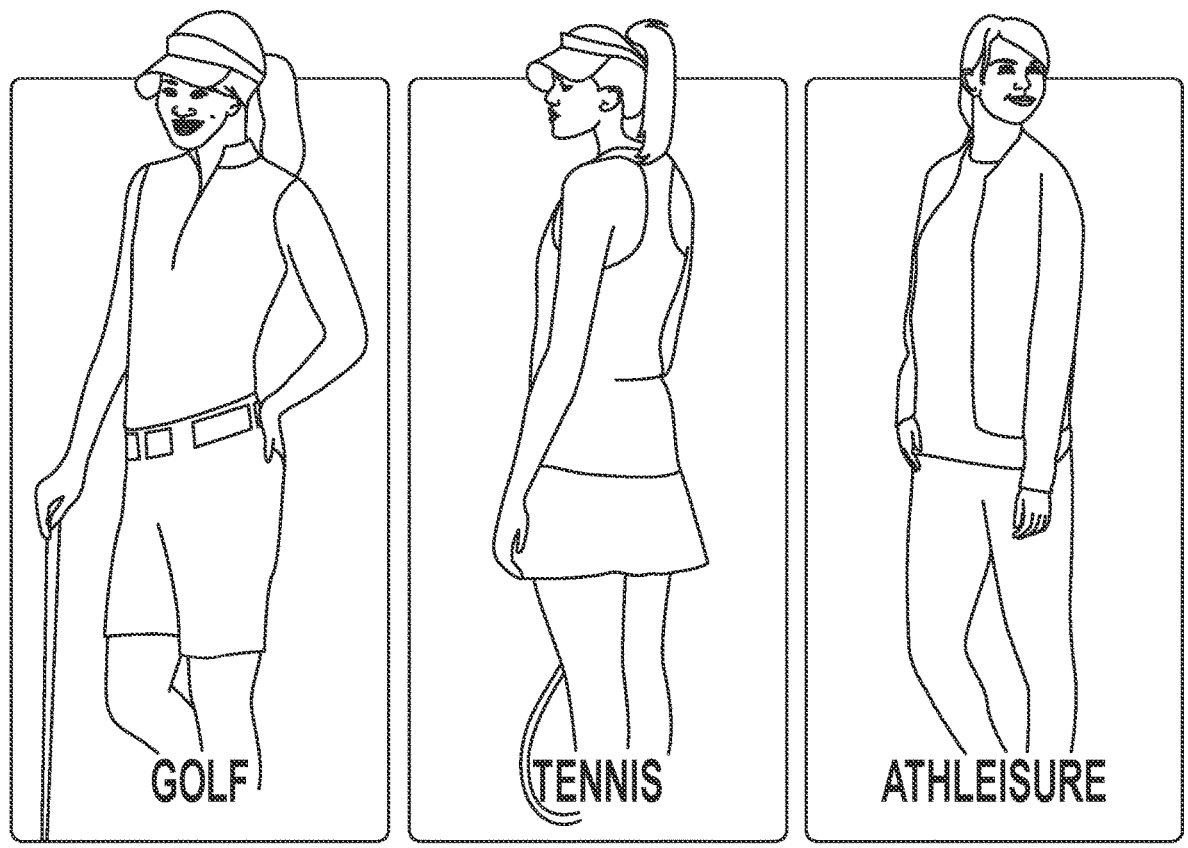
FIG. 8 depicts a user interface of reviewing pictures of clothing on the user device 202, according to embodiments described herein.
Figure 9:
FIG. 9 depicts a user interface of reviewing pictures of clothing on the user device 202, according to embodiments described herein.
Figure 10:
FIG. 10 depicts a user interface of reviewing details of clothing on the user device 202, according to embodiments described herein.
Figure 11:
FIG. 11 depicts a user interface of choosing clothing on the user device 202, wherein sizes of a set of clothing are chosen, according to embodiments described herein.
Figure 12:
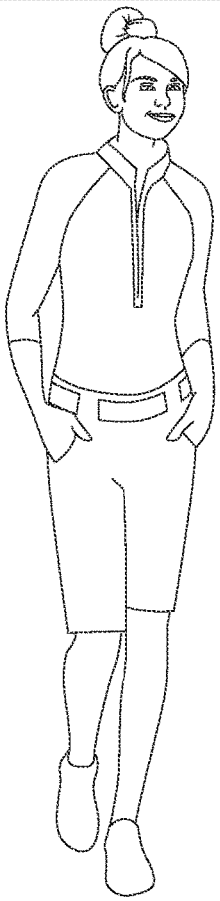
FIG. 12 depicts another user interface of choosing clothing on the user device 202, wherein the chosen set of clothing is added into a shopping cart, according to embodiments described herein.
Figure 13:
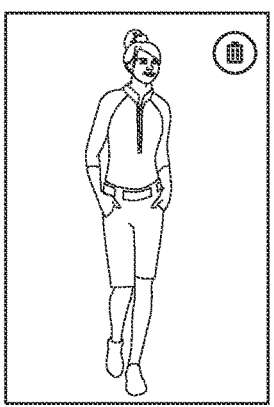
FIG. 13 depicts a user interface of reviewing clothing in the shopping cart, according to embodiments described herein.
Figure 14:
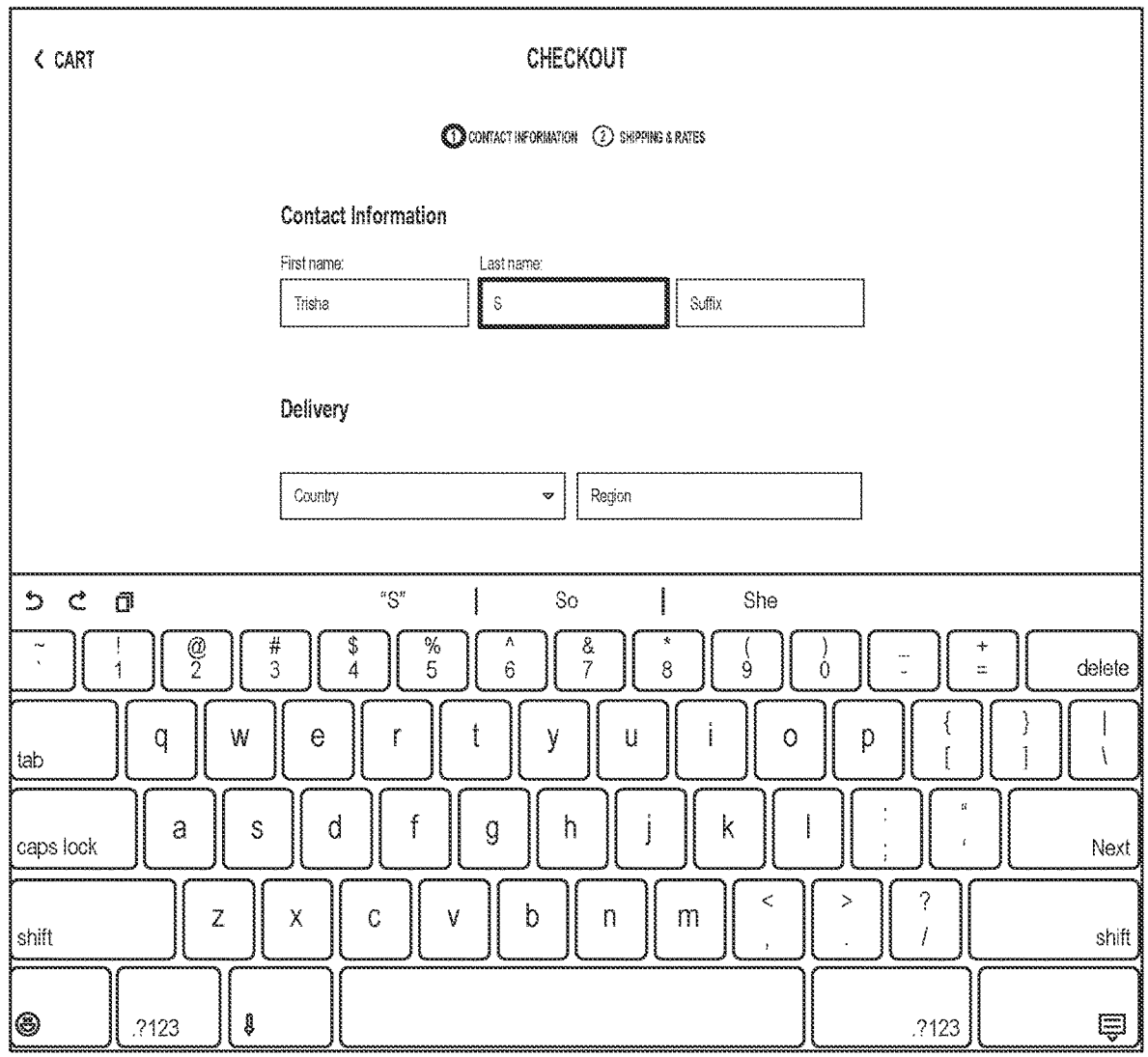
FIG. 14 depicts a user interface of providing purchase information for checkout, according to embodiments described herein.
Figure 15:
FIG. 15 depicts a user interface of choosing a delivery method for checkout, according to embodiments described herein.

In an embodiment, as shown in FIGS. 5-6, the shopping kiosk 108 further includes a connector 304, which is attached to the front of the stand 204. In this embodiment, the connector 304 includes a protruding portion 306 that is in the shape of a cross. The protruding portion 306 can be in any shape, as long as the protruding portion 306 can be securely engaged with the user device 202. In this embodiment, two pads 308 are provided below the cross-shaped protruding portion 306 and work as a cushion after the user device 202 is attached to the connector 304. Accordingly, referring to FIG. 7, a groove 310 engaged with the protruding portion 306 is provided in a holder 312 of the user device 202. For example, the cross-shaped protruding portion 306 can be inserted into the cross-shaped groove 310, and the protruding portion 306 is engaged with the groove 310, so that the user device 202 can be securely attached to the front of the stand 204.

Figure 16:
FIG. 16 depicts a user interface of customizing a set of clothing through an outfit builder option, according to embodiments described herein.

The shopping kiosk 108 can be provided to any retailers. For example, the shopping kiosk 108 can be placed in any store, golf or tennis pro shops, boutiques, restaurants, hair salons, fitness centers, theatres, airport, train station, etc. A potential customer can view introductory contents for the clothing on the user device 202, and try on clothing samples to learn one or more of the correct size, style, color, material, etc. The potential customer can browse through curated outfits, and utilize the "outfit builder option" (as shown in FIG. 16) in the shopping application to customize their look. If the customer is satisfied with the clothing, he/she can place an order through the shopping application on the user device. The shopping application communicates with the back-end server 102 and retrieves the data stored in the database 104 through the backend server 102. Referring to FIGS. 8-16, the potential customer reviews the clothing through the user device 202, selects the desired clothing, and adds the desired clothing into a shopping cart. In an embodiment, the potential customer can review a plurality of pictures and introductory texts on the user device 202 to further learn more about the clothing of interest. In an embodiment, a size (the potential customer can choose the size by trying the sample outfit hung on the shopping kiosk), a material (the potential customer can feel the fabric by touching the sample outfit), a style, and/or a color can be chosen by the potential customer.

In an example, the shopping application shows a rotating display of, for example, ten outfits, which eliminates the time spent shopping for the customer. The potential customer can scroll through the ten looks of the outfits. Further, the potential customer can utilize the outfit builder function (as shown in FIG. 16) where he/she can scroll tops and bottoms separately to create a custom outfit. The pieces of clothing can be purchased separately or purchased as a bundle. The bundled outfits purchase will offer a discount. Once the style of the clothing is chosen, the potential customer can then try on the appropriate tops and bottoms by using the available fit samples hanging on the shopping kiosk 108. This allows the potential customer to gain a "look and feel" for the clothing she is considering purchasing. The potential customer can then order his/her size in the chosen custom outfit, and the clothing provider (e.g., brand owner) will then deliver the ordered clothing to the customer directly. The customer will also receive a pre-paid return label along with instructions on how to return directly to the brand owner, instead of the retailer. The clothing samples will be updated by the brand owner once the style of clothing is no longer offered or the clothing samples have become too used.

In an embodiment, the customer selects the desired articles of clothing and puts them into a shopping cart. Then referring to FIG. 14, the customer inputs information regarding his/her name, delivery address, contact information, delivery option, and places an order. The customer can pay for the order by a credit card, a debit card, a bank account, PayPal, Apple Pay, etc.

In an embodiment, after an order is placed and payment is made, an invoice, order and tracking information will be automatically provided from the back-end server 102 to the customer through, for example, the shopping application. In another embodiment, the invoice, order and tracking information can be emailed to the customer. Subsequently, the fulfillment center 106 (e.g., brand owner) will deliver the clothing, fulfilling the order, to the customer at a delivery address provided by the customer.

Furthermore, in an embodiment, a monthly commission check will be issued to the retailer having the shopping kiosk 108, together with a sales report. The sales report includes details of orders placed through the particular shopping kiosk 108 within a specified time period, e.g., one month. In another embodiment, the commission check and the sales report can be issued weekly, biweekly, seasonally, or annually. The commission rate is determined by annual sales of the retailer hosting the shopping kiosk 108. The commission rate is scaled, and larger annual sales result in a higher commission rate. In an embodiment, both wholesales and kiosk sales are totaled to determine annual sales.

In an embodiment, new clothing samples can be provided to the retailer and put on the shopping kiosk 108, if new clothing designs are made and launched.

In an embodiment, with the shopping kiosk 108 of the AVI system 100, customers can select an outfit of their choice, and then customize it through size and color through the shopping application, e.g., iOS application. The customers can view extensive categories of outfits through the shopping application. The shopping application (e.g., iOS application) acts as an extender on Shopify platform (Shopify is an E-commerce technology platform that maintains inventory and payments). In an embodiment, the stand 204 of the shopping kiosk 108 only occupies a small space, for example, several square feet. The shopping kiosk 108 provides a curated size sample set, allowing customers to understand sizing and fabrication before making an online transaction. The fulfillment center 106 (e.g., a brand owner) will deliver the purchased product (e.g., an outfit) to an address specified by the customer.

The shopping kiosk 108 of the AVI system 100 provides both values to the customer and to the investor (e.g., a retailer). On the one hand, the retailer receives a commission for each product sold through the shopping kiosk 108 without having to hold or stock inventory. The AVI system 100 provides a low-risk selling mode for retailers (e.g., shop owners). The shop owner only needs to pay a monthly fee to maintain the shopping kiosk 108, which is a low burden for the shop owner. The AVI system 100 also only occupies a small footprint in the retailer's establishment. On the other hand, the AVI system 100 provides the customers with direct ordering access, together with a size run of garments, so that the customers are able to try before they buy, and thus the customers know exactly what to expect before completing their transaction. Meanwhile, the customers also have the ability to mix and match styles to create a particular outfit, compared to just browsing through multiple categories online.

With the shopping kiosk 108 of the AVI system 100, the retail shop owner can sell branded products (e.g., clothing) without purchasing any inventory. Meanwhile, the brand owner can receive a greater margin by selling the products at a retail price. The brand owner shares a commission with the shop owner. The commission is determined by volume per month sold on each shopping kiosk. If a brand owner sells products only through a shopping kiosk 108, the price of the products can be decided at the discretion of the brand owner. For example, the brand owner can mark down the products on some occasions. On the contrary, if a retail shop purchases products wholesale, the brand owner has to defer to decisions of the retail shop owner, which handcuffs the brand owner.

Moreover, the brand owner can benefit from not only a larger margin, but also a more diverse market. The retail shop owners are more receptive to sell branded products due to the fact that the retail shop owner does not need to purchase inventory. Brand owners without a wholesale sales team can gain space in retail partner stores by offering branded products on a shopping kiosk 108. The brand owner can remotely upload new and different outfits as often as needed. The brand owners also have the ability to offer different categories on the shopping kiosk 108. The customers would start shopping by choosing a category if the brand owner offers more than one category.

The customers can benefit from having more options in the retail shops. The customers can be introduced to new and different branded products, even some branded products that the retailers would not have otherwise purchased at wholesale. Further, the customers are able to touch, feel and understand the quality, fit and color of the clothing while shopping digitally.

In an embodiment, a mobile application, which can be installed on mobile phones, can be provided to review and order the clothing. While the customers are able to preview upcoming new curated outfits from brand owners through mobile phones, they can use a store locator option to locate the closest retail shop where a shopping kiosk of the AVI system is placed.

In an embodiment, merchandised mannequins are provided beside a shopping kiosk 108 to show the sample clothing. Additionally, dressing rooms, a social area offering refreshments and seats can be provided together with the shopping kiosk. In an embodiment, the shopping kiosk provider can receive fees from one or more brand owners for the lease and maintenance of the shopping kiosk, as well as a percentage of sales from each brand owner.

Figure 17:
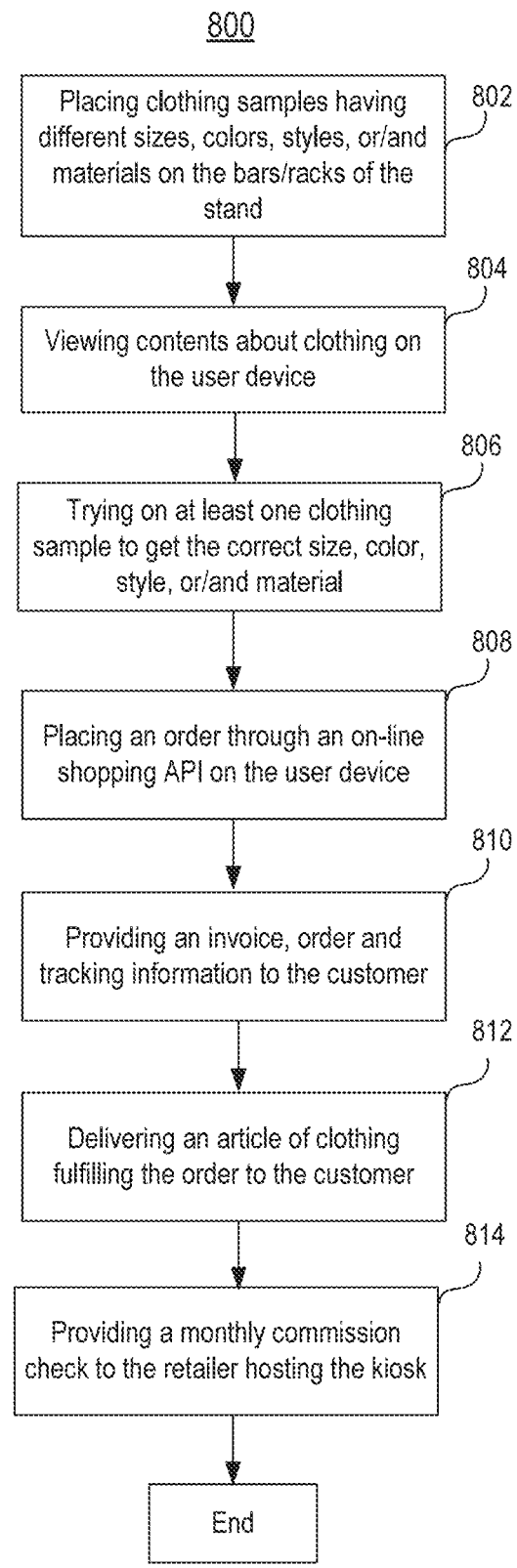
FIG. 17 depicts a flowchart 800 of purchasing clothing through the AVI system, according to embodiments described herein.

FIG. 17 depicts a flowchart of a method 800 of purchasing clothing through an AVI system 100. Referring to FIGS. 2 and 17, at step 802, a plurality of clothing samples having different sizes, colors, styles, materials, etc., are hung on one or more bars or racks 206 of a stand 204. At step 804, a potential customer views contents, for example, introductory texts, pictures, videos, etc., about clothing on a user device 202 fixed at the top of the stand 204. At step 806, the customer tries on at least one clothing sample until the customer gets the right size, color, style and/or material. At step 808, if the customer is satisfied with one or more clothing samples, the customer places an order through the user device 202. In an embodiment, the customer can place an order through a shopping application on the user device 202. In another embodiment, the customer can place an order through a shopping website on the user device 202. At step 810, an invoice, order and tracking information can be provided to the customer through the shopping application, a user account on a web site and/or an email. At step 812, one or more articles of clothing, fulfilling the order, are delivered to the customer at the mailing address provided by the customer. At step 814, a monthly commission check is sent to the retailer hosting the shopping kiosk 108.

Figure 18:
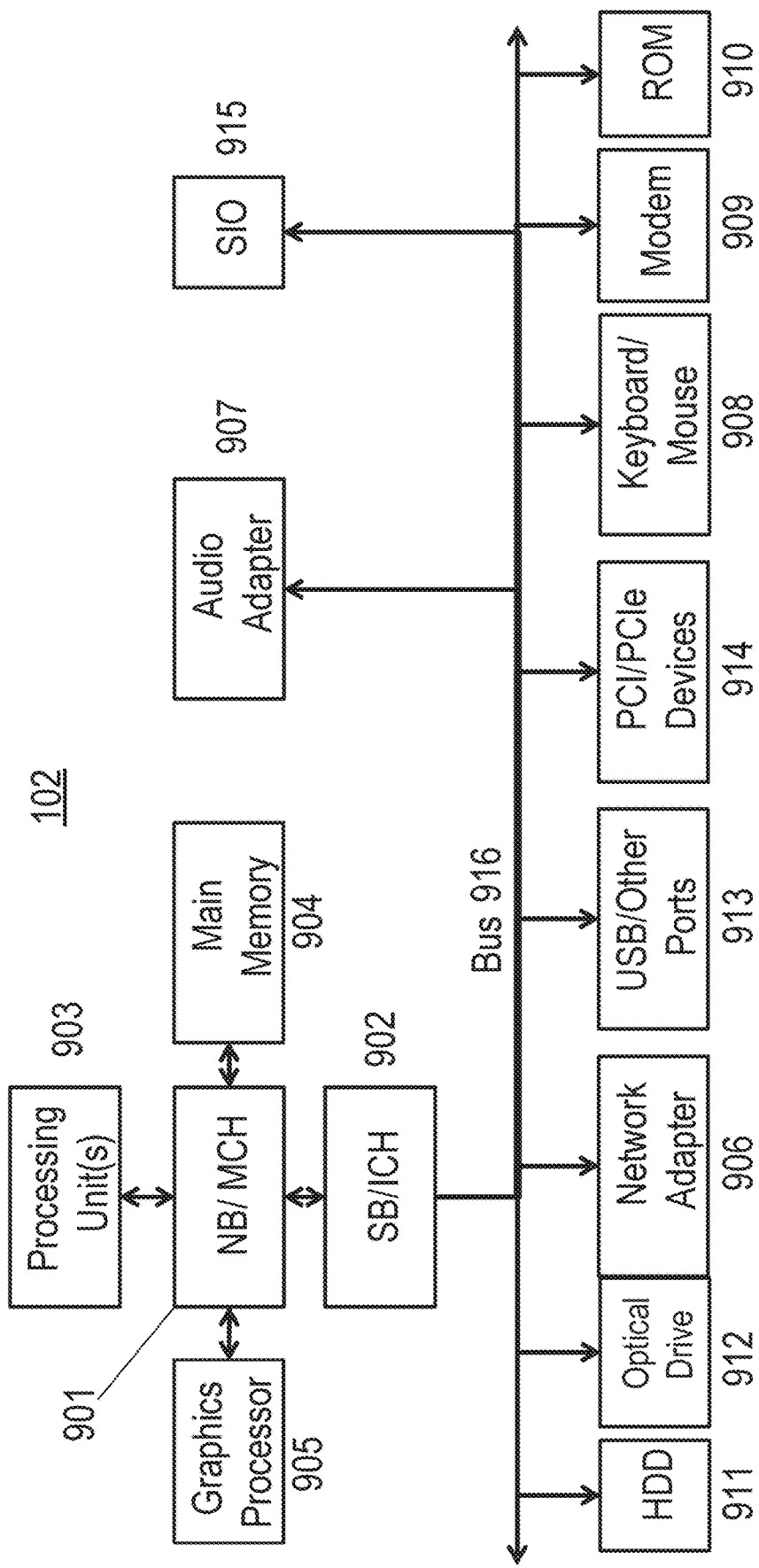
FIG. 18 depicts a block diagram of an example back-end server 102 in which aspects of the illustrative embodiments may be implemented.

FIG. 18 is a block diagram of an example back-end server 102 in which aspects of the illustrative embodiments may be implemented. Referring to FIGS. 1 and 20, the back-end server 102 is an example of a computer, in which computer usable code or instructions implementing the process for illustrative embodiments of the present invention are located.

In the depicted example, the back-end server 102 may employ a hub architecture including a north bridge and memory controller hub (NB/MCH) 901 and south bridge and input/output (I/O) controller hub (SB/ICH) 902. Processing unit 903, main memory 904, and graphics processor 905 may be connected to the NB/MCH 901. Graphics processor 905 may be connected to the NB/MCH 901 through an accelerated graphics port (AGP) (not shown in FIG. 18).

In the depicted example, the network adapter 906 connects to the SB/ICH 902. The audio adapter 907, keyboard and mouse adapter 908, modem 909, read only memory (ROM) 910, hard disk drive (HDD) 911, optical drive (CD or DVD) 912, universal serial bus (USB) ports and other communication ports 913, and the PCI/PCIe devices 914 may connect to the SB/ICH 902 through bus system 916. PCI/PCIe devices 914 may include Ethernet adapters, add-in cards, and PC cards for notebook computers. ROM 910 may be, for example, a flash basic input/output system (BIOS). The HDD 911 and optical drive 912 may use an integrated drive electronics (IDE) or serial advanced technology attachment (SATA) interface. The super I/O (SIO) device 915 may be connected to the SB/ICH 902.

An operating system may run on processing unit 903. The operating system could coordinate and provide control of various components within the back-end server 102. The operating system may be a commercially available operating system. An object-oriented programming system, such as the Java™ programming system, may run in conjunction with the operating system and provide calls to the operating system from the object-oriented programs or applications executing on the back-end server 102. The back-end server 102 may be a symmetric multiprocessor (SMP) system that may include a plurality of processors in the processing unit 903. Alternatively, a single processor system may be employed.

Instructions for the operating system, the object-oriented programming system, and applications or programs are located on storage devices, such as the HDD 911, and are loaded into the main memory 904 for execution by the processing unit 903. The processes for embodiments of the generation system may be performed by the processing unit 903 using computer usable program code, which may be located in a memory such as, for example, main memory 904, ROM 910, or in one or more peripheral devices.

A bus system 916 may be comprised of one or more busses. The bus system 916 may be implemented using any type of communication fabric or architecture that may provide for a transfer of data between different components or devices attached to the fabric or architecture. A communication unit such as the modem 909 or network adapter 906 may include one or more devices that may be used to transmit and receive data.

Those of ordinary skill in the art will appreciate that the hardware depicted in FIG. 18 may vary depending on the implementation. Other internal hardware or peripheral devices, such as flash memory, equivalent non-volatile memory, or optical disk drives may be used in addition to or in place of the hardware depicted. Moreover, the back-end server 102 may take the form of a number of different data processing systems, including but not limited to, client user devices, server user devices, tablet computers, laptop computers, telephone or other communication devices, personal digital assistants, and the like. Essentially, the back-end server 102 may be any known or later developed data processing system without architectural limitation.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The present description may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one may also be present. That is, these terms/phrases are not intended to limit the description to a single feature/element being present or require that a plurality of such features/elements be present. To the contrary, these terms/phrases only require at least a single feature/element with the possibility of a plurality of such features/elements being within the scope of the description.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes may be implemented using hardware components, software components, and/or combinations thereof.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention.

I claim:

1. An Annuity through Virtual Inventory (AVI) system, comprising:
    a back-end server; and
    one or more shopping kiosks, each shopping kiosk comprising:
        a user device; and
        a stand, wherein the user device is placed on the stand, wherein the stand further comprises one or more bars at an upper part of the stand, and one or more clothing samples are capable of being hung on the one or more bars;
        wherein one or more orders are placed by a customer through a shopping application installed on the user device after trying on the one or more clothing samples.

2. The system of claim 1, further comprising:
    a fulfillment center for receiving and fulfilling the order, wherein the order is fulfilled by selecting the ordered clothing from an inventory of clothing remote to the shopping kiosks and shipping the ordered clothing to an address provided by the customer.

3. The system of claim 1, wherein the user device is a tablet, and the shopping application is an iOS application.

4. The system of claim 1, wherein each shopping kiosk further comprising:
    a connector attached to the front of the stand, and the connector comprises a protruding portion;
    a holder for holding the user device, wherein the holder comprises a groove engaged with the connector.

5. The system of claim 4, wherein the protruding portion is in a shape of a cross, and the groove is in a shape of the cross.

6. The system of claim 1, wherein the customer previews different pieces of clothing through the shopping application.

7. The system of claim 1, each shopping kiosk further comprising a backup battery, wherein the backup battery is connected to the user device.

8. The system of claim 1, further comprising a credit card processor, wherein the order is paid by a credit card through the credit card processor.

9. The system of claim 1, wherein a commission is calculated based on all the pieces of clothing sold in the one or more orders.

10. The system of claim 1, wherein the back-end server includes a Shopify platform.

11. The system of claim 1, wherein the customer selects a top and a bottom separately to create a custom outfit.

12. A method of placing an order through a shopping kiosk comprising a stand and a user device placed on the stand, wherein the stand further comprises one or more bars and a plurality of clothing samples are placed on the one or more bars, the method comprising:
    viewing, by a customer, contents about clothing on the user device;
    trying on, by the customer, at least one clothing sample to get a correct size, color, style, and material of the clothing;
    placing, by the customer, an order through a shopping application installed on the user device;
    receiving, by the customer, an invoice, order and tracking information from the shopping application; and
    receiving, by the customer, an article of clothing fulfilling the order.

13. The method of claim 12, further comprising:
    providing, by a seller of the clothing, a commission to a retailer hosting the shopping kiosk.

14. The method of claim 13, wherein the commission is calculated based on all the pieces of clothing sold through the shopping kiosk.

15. The method of claim 12, wherein the user device is a tablet, and the shopping application is an iOS application.

16. The method of claim 12, wherein the shopping kiosk further comprising:
    a connector attached to the front of the stand, and the connector comprises a protruding portion;
    a holder for holding the user device, wherein the holder comprises a groove engaged with the connector.

17. The method of claim 16, wherein the protruding portion is in a shape of a cross, and the groove is in a shape of the cross.

18. The method of claim 12, the shopping kiosk further comprising a backup battery, wherein the backup battery is connected to the user device.

19. The method of claim 12, the shopping kiosk further comprising a credit card processor, wherein the order is paid by a credit card through the credit card processor.

20. The method of claim 12, further comprising:
    selecting, by the customer, a top and a bottom separately to create a custom outfit.

* * * * *